(12) United States Patent
Jadhav et al.

(10) Patent No.: US 10,991,265 B2
(45) Date of Patent: Apr. 27, 2021

(54) SYSTEMS AND METHODS FOR INTELLIGENT GENERATION OF INCLUSIVE SYSTEM DESIGNS

(71) Applicant: Tata Consultancy Services Limited, Mumbai (IN)

(72) Inventors: Charudatta Jadhav, Mumbai (IN); Sumeet Agrawal, Mumbai (IN); Sonali Joshi, Mumbai (IN)

(73) Assignee: Tata Consultancy Limited Services, Mumbai (IN)

( * ) Notice: Subject to any disclaimer, the term of this patent is extended or adjusted under 35 U.S.C. 154(b) by 499 days.

(21) Appl. No.: 16/052,298

(22) Filed: Aug. 1, 2018

(65) Prior Publication Data
US 2019/0042668 A1 Feb. 7, 2019

(30) Foreign Application Priority Data
Aug. 2, 2017 (IN) .............................. 201721027488

(51) Int. Cl.
*G06F 9/44* (2018.01)
*G09B 19/00* (2006.01)
(Continued)

(52) U.S. Cl.
CPC ........... *G09B 19/0053* (2013.01); *G06F 8/38* (2013.01); *G06K 9/00335* (2013.01); *G06N 5/02* (2013.01); *G06N 20/00* (2019.01); *G09B 21/00* (2013.01)

(58) Field of Classification Search
CPC ....... G06F 8/38; G09B 19/0053; G09B 21/00; G06N 5/02; G06N 20/00; G06K 9/00335
(Continued)

(56) References Cited

U.S. PATENT DOCUMENTS

| 7,769,705 | B1 * | 8/2010 | Luechtefeld | ........... G06Q 10/06 706/47 |
| 8,874,431 | B2 * | 10/2014 | Abir | ........................ G06F 16/30 704/9 |

(Continued)

OTHER PUBLICATIONS

Cabrero, "Participatory Design of Persona Artefacts for User experience in non-WEIRD Cultures", 2014, ACM, pp. 247-250 (Year: 2014).*

(Continued)

*Primary Examiner* — Ted T. Vo
(74) *Attorney, Agent, or Firm* — Finnegan, Henderson, Farabow, Garrett & Dunner, L.L.P.

(57) ABSTRACT

In spite of complying with accessibility standards and guidelines, it is noted that persons with disabilities (PwD) continue to face usability challenges when accessing content. The present disclosure addresses these challenges by firstly identifying design considerations for each type of disability and facilitates intelligent generation of inclusive system designs that addresses usability and accessibility challenges based on persona, scenario and modality associated with users of all abilities, hence being inclusive. Systems and methods of the present disclosure aide designers with a comprehensive knowledge bank of captured challenges, needs and effectiveness of modalities, the outcomes and existing design considerations that may be prompted at appropriate state of development of system designs to help designers make informed design choices without curtailing their creativity thus digitizing the end-to-end design process. An Artificial Intelligence-Machine Learning module facilitates automated generation of run-time interface using cognitive inputs from designers.

5 Claims, 6 Drawing Sheets

(51) Int. Cl.
  *G06N 20/00* (2019.01)
  *G06F 8/38* (2018.01)
  *G06K 9/00* (2006.01)
  *G06N 5/02* (2006.01)
  *G09B 21/00* (2006.01)

(58) Field of Classification Search
  USPC ............... 717/104–109, 125–126, 149–150
  See application file for complete search history.

(56) References Cited

U.S. PATENT DOCUMENTS

| | | | |
|---|---|---|---|
| 9,563,422 | B2 | 2/2017 | Cragun et al. |
| 10,252,145 | B2 * | 4/2019 | Tran ...................... A63F 13/211 |
| 10,846,274 | B2 * | 11/2020 | Hatami-Hanza ........ G06F 16/22 |
| 2013/0007011 | A1 | 1/2013 | Setlur et al. |
| 2013/0080911 | A1 | 3/2013 | Klemm |
| 2017/0337287 | A1 * | 11/2017 | Gill ..................... G06F 16/9537 |
| 2019/0324990 | A1 * | 10/2019 | Faith ..................... G06N 5/022 |

OTHER PUBLICATIONS

Madureira et al., "Using Personas for Supporting User Modeling on Scheduling Systems", 2014, IEEE, pp. 279-284 (Year: 2014).*

* cited by examiner

SYSTEMS AND METHODS FOR INTELLIGENT GENERATION OF INCLUSIVE SYSTEM DESIGNS

PRIORITY CLAIM

This U.S. patent application claims priority under 35 U.S.C. § 119 to: Indian Patent Application No. 201721027488, filed on 2 Aug. 2017. The entire contents of the aforementioned application are incorporated herein by reference.

TECHNICAL FIELD

The disclosure herein generally relates to human-computer interaction (HCI), and more particularly to systems and methods for intelligent generation of inclusive system designs.

BACKGROUND

Information and Communications Technology (ICT) has become an integral part of everyday work, social, and personal lives. Mobile penetration has helped technology to reach wider audience including people with disabilities and elderly users. But presently, less than 3% of ICT products and services are practically accessible and usable for persons with disabilities (PwD). Universal design standards and accessibility guidelines somewhat serve the cause; however, it is noted that merely complying with standards like Web Content Accessibility Guidelines (WCAG) while developing ICT products and services does not automatically address all usability and interaction needs of differently abled users. These usability needs can only be addressed by implementing appropriate design considerations. Depending upon physical limitations of a user, assistive technology tools may be employed to interact with technology. As the assistive technology changes, the interaction patterns also change thereby impacting the design considerations. The challenges faced during micro interactions depending upon the type of disability and assistive technology used need to be studied. There has been extensive work done on how cultural, gender and ethnic aspects affect design solutions but how the type of disabilities impacts design and design pattern has not been studied extensively. The design considerations employed today are totally dependent on the designers' competency and knowledge of the accessibility domain which has a big learning curve.

SUMMARY

Embodiments of the present disclosure present technological improvements as solutions to one or more of the above-mentioned technical problems recognized by the inventors in conventional systems.

In an aspect, there is provided a processor implemented method for intelligent generation of an inclusive system design on the fly in response to a received requirement or one or more user actions, the method comprising the steps of: capturing, by one or more processors, a stage of rendering the inclusive system design pertaining to the received requirement involving at least one of a service and interaction design; obtaining, by the one or more processors, from a knowledge bank, at least one of a pre-defined scenario and a pre-defined transaction pertaining to the received requirement; dynamically disintegrating, by the one or more processors, at least one of the pre-defined scenario and the pre-defined transaction into associated one or more tasks, activities, interaction patterns and microinteractions comprised in the knowledge bank; identifying, by the one or more processors, from the knowledge bank, one or more pre-defined functional limitations associated with each of the one or more tasks, activities, interaction patterns and micro interactions; identifying, by the one or more processors, from the knowledge bank, one or more pre-defined modes used for each of the tasks, activities, interaction patterns and micro interactions; identifying, by the one or more processors, from the knowledge bank, one or more challenges associated with each of the tasks, activities, interaction patterns and micro interactions based on the identified one or more functional limitations and the identified one or more pre-defined modes; defining, by the one or more processors, a static persona corresponding to each combination of the identified one or more functional limitations, the identified one or more pre-defined modes, the one or more challenges and the one or more tasks, activities, interaction patterns and micro interactions; outputting, by the one or more processors, a best fit design solution corresponding to each of the defined static persona, wherein the best fit design solution is selected from one or more standards and one or more existing design solutions comprised in the knowledge bank; generating, by the one or more processors, a design pool of multi-modal designs corresponding to each of the defined static persona based on the best fit design solution associated thereof, one or more cognitive inputs from a designer pertaining to the best fit design solution, and the captured stage of rendering the inclusive system design; rendering, by the one or more processors, the inclusive system design corresponding to one of the defined static persona as a design-time interface to a user; capturing in real time, by the one or more processors, (i) a behavioral pattern of the user (ii) a mode from the one or more pre-defined modes, used by the user, (iii) the one or more challenges faced by the user and (iv) the one or more tasks, activities, interaction patterns and micro interactions performed by the user, based on the one or more user actions; identifying, by the one or more processors, a dynamic persona corresponding to the captured behavioral pattern of the user; and rendering, by the one or more processors, the inclusive system design on the fly corresponding to the identified dynamic persona as a run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user.

In an embodiment of the present disclosure, the method above further comprises updating a pre-defined automated dynamic interface generation logic based on the received one or more cognitive inputs; and updating the knowledge bank with the inclusive system design rendered on the fly as part of the one or more existing design solutions and the captured behavioral pattern as part of the one or more functional limitations.

In another aspect, there is provided a system for intelligent generation of an inclusive system design on the fly in response to a received requirement or one or more user actions, the system comprising: one or more internal data storage devices operatively coupled to one or more hardware processors for storing instructions configured for execution by the one or more hardware processors, the instructions being comprised in: a knowledge bank comprising: a services module configured to store a plurality of scenarios and transactions pertaining to a plurality of requirements involving at least one of a service and interaction design; and a plurality of task, activities, interaction patterns and micro-interactions corresponding to one or more of the plurality of scenarios and transactions; a medical module configured to store one or more pre-defined functional limitations associated with each of the tasks, activities, interaction patterns and micro interactions; a modalities module configured to store one or more pre-defined modes used for each of the tasks, activities, interaction patterns and micro interactions; a challenges module configured to store one or more challenges associated with each of the tasks, activities, interaction patterns and micro interactions based on the identified one or more functional limitations and the identified one or more pre-defined modes; and a solutions module configured to store one or more standards and one or more existing design solutions; an Artificial Intelligence-Machine Learning (AI-ML) module configured to capture real time need and preferences of a user and enable learning thereof over a period of time, the AI-ML module comprising: a behavioral pattern module configured to capture (i) a behavioral pattern of the user (ii) a mode from the one or more pre-defined modes, used by the user, (iii) the one or more challenges faced by the user and (iv) the one or more tasks, activities, interaction patterns and micro interactions performed by the user, based on one or more user actions; an automated dynamic interface generation logic configured to receive one or more cognitive inputs from a designer pertaining to a best fit design solution and evolve through machine learning and further configured to receive a dynamic persona corresponding to the captured behavioral pattern of the user for making an automated decision on a run-time interface; a persona creator module configured to define a static persona corresponding to each combination of the identified one or more functional limitations, the identified one or more pre-defined modes, the one or more challenges and the one or more tasks, activities, interaction patterns and micro interactions and further configured to identify the dynamic persona; an automated static interface design module configured to store a prebuilt multi-modal library of Application Programming Interfaces (APIs) providing modular level design corresponding to the one or more pre-defined modes and further configured to generate a design pool of multi-modal designs corresponding to each of the defined static persona based on at least one of the one or more standards and the one or more existing design solutions identified as the best fit design solution, one or more cognitive inputs from a designer pertaining to the best fit design solution and a captured stage of rendering the inclusive system design; and a rendering module configured to: capture a stage of rendering the inclusive system design pertaining to the received requirement involving at least one of a service and interaction design and render the inclusive system design corresponding to one of the defined static persona as a design-time interface to the user and based on the captured stage of rendering; and render the inclusive system design on the fly corresponding to the identified dynamic persona as the run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user.

In yet another aspect, there is provided a computer program product comprising a non-transitory computer readable medium having a computer readable program embodied therein, wherein the computer readable program, when executed on a computing device, causes the computing device to: capture a stage of rendering the inclusive system design pertaining to the received requirement involving at least one of a service and interaction design; obtain from a knowledge bank, at least one of a pre-defined scenario and a pre-defined transaction pertaining to the received requirement; dynamically disintegrate at least one of the pre-defined scenario and the pre-defined transaction into associated one or more tasks, activities, interaction patterns and microinteractions comprised in the knowledge bank; identifying, by the one or more processors, identify from the knowledge bank, one or more pre-defined functional limitations associated with each of the one or more tasks, activities, interaction patterns and micro interactions; identify from the knowledge bank, one or more pre-defined modes used for each of the tasks, activities, interaction patterns and micro interactions; identify from the knowledge bank, one or more challenges associated with each of the tasks, activities, interaction patterns and micro interactions based on the identified one or more functional limitations and the identified one or more pre-defined modes; define a static persona corresponding to each combination of the identified one or more functional limitations, the identified one or more pre-defined modes, the one or more challenges and the one or more tasks, activities, interaction patterns and micro interactions; output a best fit design solution corresponding to each of the defined static persona, wherein the best fit design solution is selected from one or more standards and one or more existing design solutions comprised in the knowledge bank; generate a design pool of multi-modal designs corresponding to each of the defined static persona based on the best fit design solution associated thereof, one or more cognitive inputs from a designer pertaining to the best fit design solution, and the captured stage of rendering the inclusive system design; render the inclusive system design corresponding to one of the defined static persona as a design-time interface to a user; capture in real time (i) a behavioral pattern of the user (ii) a mode from the one or more pre-defined modes, used by the user, (iii) the one or more challenges faced by the user and (iv) the one or more tasks, activities, interaction patterns and micro inter-actions performed by the user, based on the one or more user actions; identify a dynamic persona corresponding to the captured behavioral pattern of the user; and render the inclusive system design on the fly corresponding to the identified dynamic persona as a run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
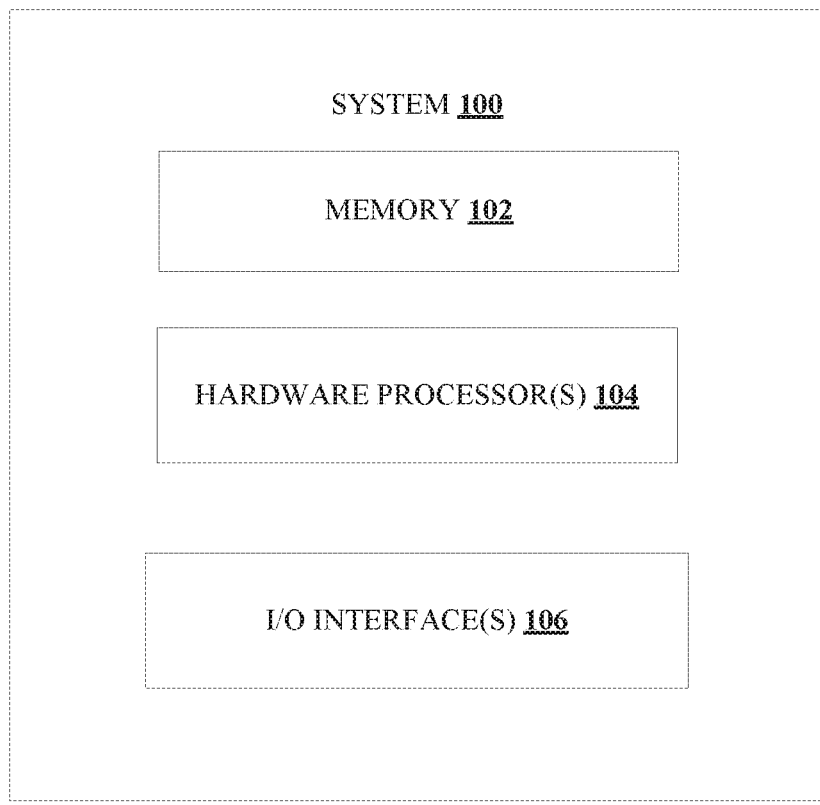
FIG. 1 illustrates an exemplary block diagram of a system for intelligent generation of inclusive system designs, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Today most of the Information and Communications Technology (ICT) products and services are generally designed for access of content by mainstream users which often lead to excluding users from one or more groups like persons with disabilities (PwDs). Although designers may want to design inclusively for a better user experience, there is ignorance and lack of understanding of the challenges faced by PwDs, their specific needs depending upon scenarios encountered and assisted tools used for interacting with ICT products and services. Systems and methods of the present disclosure address these challenges by identifying design considerations for each type of disability and facilitate intelligent generation of inclusive system designs that addresses usability and accessibility challenges based on persona, scenario and modality associated with users of all abilities, hence being inclusive. The expression "content" used hereinafter refers to information and experiences that are directed to an end-user expressed in any medium such as speech, text, images, and the like. A user may encounter content as part of user experience on web sites or stand-alone applications or even interactions with various electronic devices associated thereof. The present disclosure addresses usability and accessibility challenges for people of all abilities for generating system designs that include service design and provides a larger canvas for re-imagining service and interaction design in an inclusive manner.

Referring now to the drawings, and more particularly to FIG. 1 through FIG. 4C, where similar reference characters denote corresponding features consistently throughout the figures, there are shown preferred embodiments and these embodiments are described in the context of the following exemplary system and/or method.

FIG. 1 illustrates an exemplary block diagram of a system 100 for intelligent generation of inclusive system designs, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
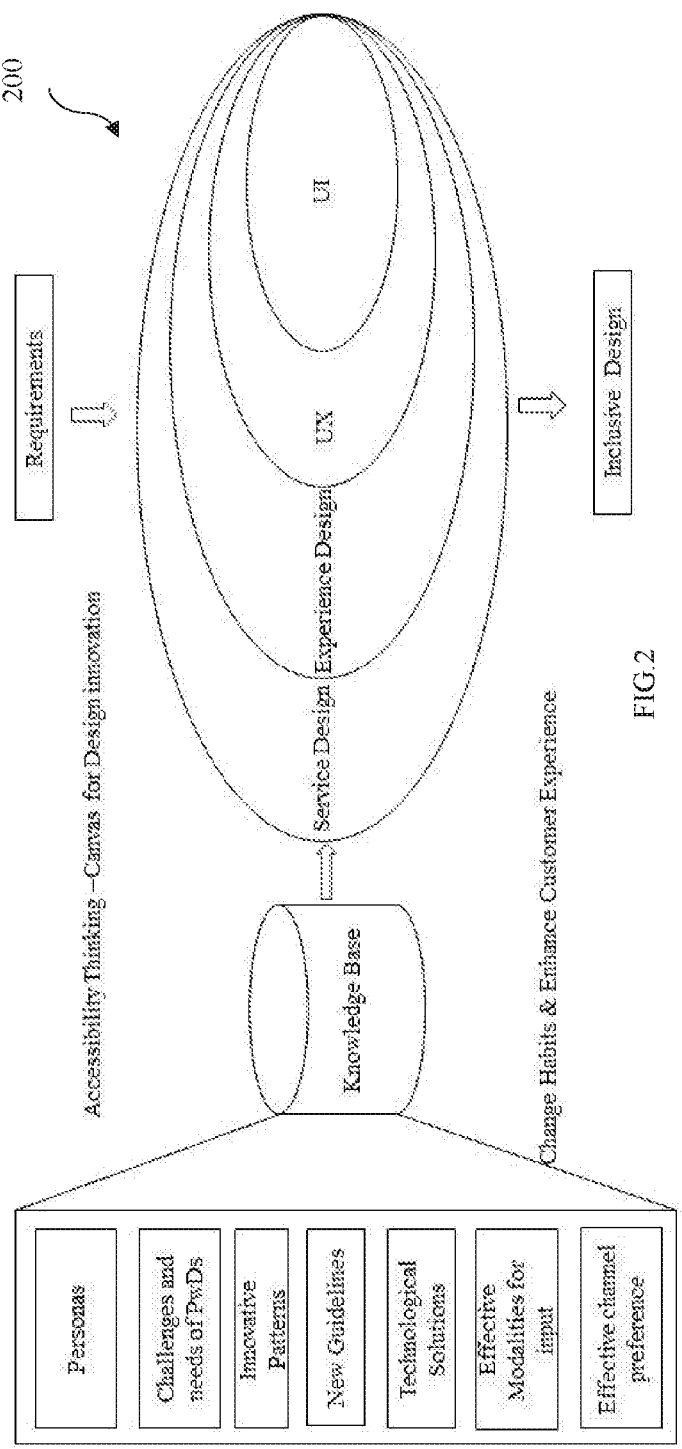
FIG. 2 illustrates an exemplary high level architecture of the system of FIG. 1, in accordance with an embodiment of the present disclosure.

FIG. 2 illustrates an exemplary high level architecture of the system of FIG. 1. Existing systems for creating designs, involve cognitive effort from the designer. The designer seeks input from various sources to understand the user context, needs, challenges and requirements. Based on this, the designer follows the existing best practices, guidelines and standards to provide the user with the best suitable design. However, since the designs are static, user experience and user interface are not necessarily satisfactory. The designs may cater to a user with a challenge or limitation but following the guidelines and standards firstly does not practically address needs and preferences of the catered user; also the design is not inclusive to cater to a mainstream user or a user with another challenge or limitation. Again, the same user may temporally or situationally have different challenges or limitations. Systems and methods of the present disclosure provide a canvas for designers to innovate designs based on a requirement by considering all types of personae thereby facilitating dynamic generation of inclusive designs for enhancing user experience. A designer may use the canvas provided to generate effective designs. Alternatively, the system of the present disclosure may render an inclusive design as a design-time interface or as a run-time interface.

Figure 3:
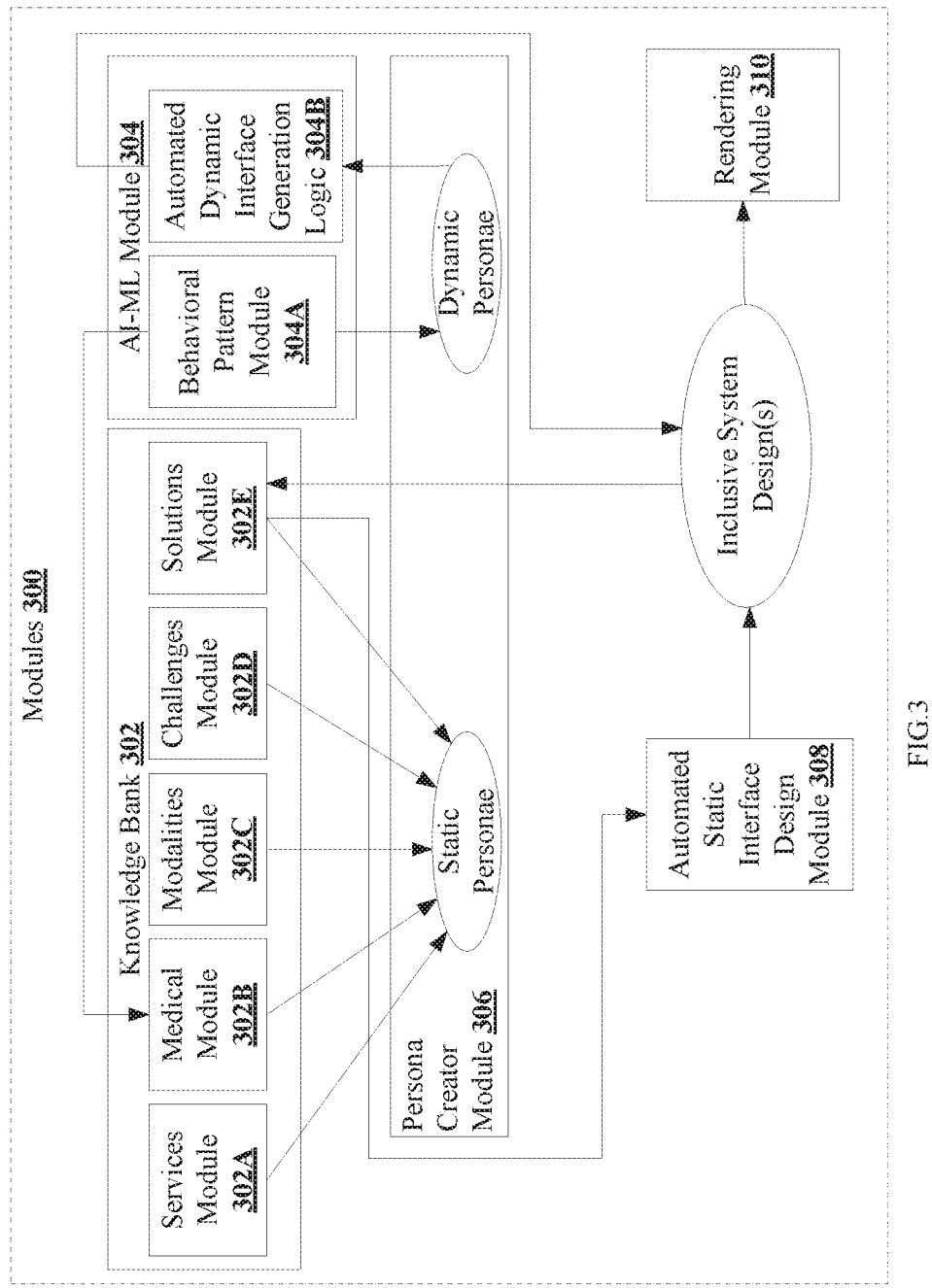
FIG. 3 illustrates exemplary functional modules comprised in the system of FIG. 1, in accordance with an embodiment of the present disclosure.

In an embodiment, the system 100 comprises one or more data storage devices or memory 102 operatively coupled to the one or more processors 104 and is configured to store instructions configured for execution of steps of the method 400 by the one or more processors 104. FIG. 3 illustrates exemplary functional modules 300 comprised in the system of FIG. 1, in accordance with an embodiment of the present disclosure. In an embodiment, the functional modules 300 include a knowledge bank 302, an Artificial Intelligence-Machine Learning (AI-ML) module 304, a persona creator module 306, an automated static interface design module 308, and a rendering module 310. In an embodiment, the one or more functional modules 300 of the system 100 can be stored in the memory 102.

As mentioned above, one of the challenges of existing systems is that it deals with a single non-inclusive persona and provides a static design irrespective of the user's persona. It is noted that current standards and guidelines such as Web Content Accessibility Guidelines (WCAG) fall short of meeting usability challenges that particularly, persons with disabilities (PwDs) face when accessing content. There are different challenges faced by differently abled persons when accessing content. Challenges may also differ based on the degree of disability. In an embodiment, exemplary non-limiting personas with functional limitations listed may be represented as below:

In an embodiment of the present disclosure, the challenges and needs may be captured in a model represented with a common Y-axis representing interaction patterns/tasks/scenarios with Basic (navigation, getting input, dealing with data, animation), Cognitive (making choices, searching, onboarding) and Persuasive (social) details and the X-Axis may represent the various types of impairments and assistive technology or aid used. For a persona "blind", the modality may be "screen reader" where speech is involved, wherein the input to the system may be speech or keyboard and the output from the system or the input to the user having a persona "blind" may be speech; accordingly

| Disability | Vision | Aural | Cognitive | Mobility |
|---|---|---|---|---|
| Impairments | Blind, Low Vision, Color blindness, Deaf blind | Deafness, Hard to hear, Deaf and Mute, Deaf and not Mute | Autism, Dyslexia, Dementia, Genetic Disability | Gross motor and locomotors functioning, Fine motor functioning, Paralysis, Tremors |
| Activity limitations | Difficulty accessing visual information | Difficulty accessing aural information or sounds | Difficulty in processing information | Difficulty accessibility physical environment, speech |
| Participation restrictions | Cannot use screen readers on inaccessible digital content and interfaces Cannot use electronic interfaces (ATMs, mobile devices, kiosks, televisions, printers, copiers, GPS) Reading text displayed in small size and poor contrast ratios Accessing content through video | Accessing content through audio and video Unable to communicate with voice-based technology tools like virtual meetings. | Often require additional time to read and process content Hard time spelling words correctly May find complex designs and tasks in digital format overwhelming Inaility to distinguish right from left in graphic images Difficulty in processing information, especially text-based using complex language | Unable to use a mouse due to difficulty/inability to use hands Need more time to interact with digital content and interfaces due to slower movements Sensitivity to flashing lights, blinking and flickering stimuli |
| Assistive Technology/Aid | Screen readers, Refreshable Braille display, Screen magnifiers | Hearing implants, Automatic Captioning | Speech recognition, Virtual keyboard | Mouth sticks and Head pointers, sip-and-puff switches, Trackball |

Impact of challenges faced due to a particular disability ('Personas') may vary based on transactions performed ('Scenarios'). For instance, for an e-learning scenario for conducting an online exam may have the following exemplary set of requirements:

Quick navigation features across the screen
One click/key stroke status updates of questions attempted/unanswered
Shortcut keys to access desired sections
Effective prompting and feedback during and after every task performed Alternatively, for an exemplary banking scenario for money transfer, following may be an exemplary set of requirements:

Provisions for security and safety
Mechanism of either reversible submission, checking before submission or confirmation before submission
Setting direct focus on interactive elements during transactions
Assistance to users in correcting the error messages It may be noted that as the scenarios change, challenges and needs change that may extend beyond those catered by the standard accessibility guidelines.

It may also be noted that as the scenarios change, although the persona is static the design considerations may change as seen in the exemplary scenarios. Also, for the same scenario, the persona may change and accordingly the design considerations may change.

input and output modalities differ. Again, for a persona "low vision", the modality may be a screen magnifier that works with speech and vision, and for a persona "Deaf Blind" the modality may be Electronic Braille display where touch is involved. The system design for accessing content needs to address the limitations of each persona depending on the type of modality used. Again, in the example scenario of banking referenced above, for money transfer, as part of security, the content may involve input of information like credit card number, pin number, etc. A user with "blind" persona may not be able to independently access the content in such scenario and do the needful although the banking application design complied with accessibility standards and guidelines and was probably providing the request in speech form with entire functionality available with keyboard support. By relying on a third person for completing the banking transaction, the user with "blind" persona may compromise on security since the application was lacking on usability aspects. Again, in the example scenario of e-learning, say objective questions are required to be answered in a given time with time remaining being displayed in a top corner. For a user with "blind" persona, even though the content access was designed as per standard guidelines to provide content in speech, unless focus is shifted to the time remaining displayed in the top corner, there is no way the "blind" user would be able to access that information. Shifting focus to that corner and then coming back to the questions may result in loss of time and thereby affect usability for the "blind" user. It may be noted that in both the example scenarios, the persona "blind" is the same, the assisted technology used may also be the same, say "screen reader", however, design considerations based on standard guidelines that generally cater to the needs of the persona "blind" do not sufficiently and effectively address the scenario based needs pertaining to the persona "blind" using the assisted technology "screen reader".

Again, a main stream user may have limitations not limited to gender, geography, age, culture, industry domain and socio-economic aspects including technology competency, internet bandwidth, and the like. Again, the main stream user may have situational limitations like in a scenario wherein the main stream user is trying to access content in a moving train, or accessing content with shopping bags in his hand. Such situational limitations can pose a challenge sometimes akin to that of a differently abled person or may pose a new challenge. A design that caters to a differently abled person may not provide a desired user experience to a mainstream user and vice versa.

Hence apart from addressing usability limitations that are missed when standards and guidelines are implemented, it is also imperative that the design is dynamically rendered in line with the user's persona. Accordingly, in the present disclosure, the user's persona is an important contributor to a decision on the design to be rendered. In accordance with the present disclosure, the system 100 captures one or more of the challenges, needs and effectiveness of modalities and establishes relationship between persona, scenario and modalities as explained hereinafter. Thus in accordance with the present disclosure, information with regards to challenges, needs, effectiveness of modalities of users of all abilities are captured and intelligent relationships between persona, scenarios and modalities are established therein. Accordingly, the knowledge bank 302 provided as part of the modules 300 comprises a services module 302A, a medical module 302B, a modalities module 302C, a challenges module 302D and a solutions module 302E.

In an embodiment, the services module 302A is configured to store a plurality of scenarios and transactions pertaining to a plurality of requirements involving at least one of a service and interaction design; and a plurality of task, activities, interaction patterns and microinteractions corresponding to one or more of the plurality of scenarios and transactions. In an embodiment, the medical module 302B is configured to store one or more pre-defined functional limitations associated with each of the tasks, activities, interaction patterns and micro interactions. In an embodiment, the pre-defined functional limitations may be provided as per International Classification of Functioning, Disability and Health (ICF). In accordance with the present disclosure, the pre-defined functional limitations may pertain to disabilities and impairments as per the International classification of Diseases (ICD). A disability may be associated with one or more impairments and one or more functional limitations depending on the impairments and vice-versa. In an embodiment, the modalities module 302C is configured to store one or more pre-defined modes used for each of the tasks, activities, interaction patterns and micro interactions. The pre-defined modes may pertain to an environment and include the physical environment, web, the Internet of Things (IoT) and the like. The pre-defined modes may also pertain to a channel and include a physical channel, electronic devices, mobile, desktop, connected car, smart homes, and the like. Again, the pre-defined modes may pertain to the modality and include vision, voice, touch, eye tracking, traditional input like keyboard and mouse, assistive input devices to use services, and the like. In an embodiment, the challenges module 302D is configured to store one or more challenges associated with each of the tasks, activities, interaction patterns and micro interactions based on the identified one or more functional limitations and the identified one or more pre-defined modes. In an embodiment, the challenges include needs and may relate to physical challenges, perception, technology, navigation, context sensitive information, mental map, and the like. In an embodiment, the solutions module 302E is configured to store one or more standards (usability standards, accessibility standards, UI design standards, etc.) and one or more existing design solutions. The existing design solutions maybe a manifestation of best practices, learnings, design guidelines, reusable components, design patterns, accessibility guidelines (not limited to technology), and the like.

In an embodiment, the Artificial Intelligence-Machine Learning (AI-ML) module 304 is configured to capture real time need and preferences of a user. In an embodiment, the AI-ML module 304 may comprise a behavioral pattern module 304A and an automated dynamic interface generation logic 304B. The behavioral pattern module 304A is configured to capture (i) a behavioral pattern of the user (ii) a mode from the one or more pre-defined modes, used by the user, (iii) the one or more challenges faced by the user and (iv) the one or more tasks, activities, interaction patterns and micro interactions performed by the user, based on one or more user actions. The captured need and preferences are updated over a period of time and evolve through artificial intelligence and facilitate machine learning for automated decision making when generating a run-time interface.

Some behavioral patterns that may be captured include:
Using only Keyboard—Can be either Keyboard only user or have visual impairment
Using Key modifiers like Insert, ALT
Detecting hand tremors during mobile usage (shivering of a person is within a particular range)
Usage of gesture for example Double Tab, Rotor Gesture (Rotating Two Fingers as if you're turning a dial), L Gestures.
Voiceover/Talkback is ON
Zoom Feature/Magnifier in ON
User using website in High Contrast Modifier.

In accordance with an embodiment, the automated dynamic interface generation logic 304B is configured to receive one or more cognitive inputs from a designer pertaining to a best fit design solution and evolve through machine learning, thus capturing the designer's cognitive abilities and further configured to receive a dynamic persona corresponding to the captured behavioral pattern of the user for making an automated decision on a run-time interface.

In an embodiment, the persona creator module 306 is configured to define a static persona corresponding to each combination of the identified one or more functional limitations, the identified one or more pre-defined modes, the one or more challenges and the one or more tasks, activities, interaction patterns and micro interactions and further configured to identify a dynamic persona corresponding to the captured behavioral pattern of the user. A persona is a description of a target user and provides a reflection of the user's demographics, preferences, challenges, goals and the like. It is a representative of a larger target audience. In accordance with the present disclosure, a user's persona may be characterized by a static persona and a dynamic persona which may or may not be in line with the static persona. A static persona is pre-defined based on a combination mentioned above. An example of a static persona is a user with regular vision, who wants to login through a web application and faces challenges related to network connectivity. Another example of a static persona is a user with low vision, who wants to login through a mobile application and faces challenges related to font size, brightness, and the like. The dynamic persona is created at run time and is based on real time need and preferences of the user. An example of a dynamic person is a user using only Keyboard, wherein the user may either be a mainstream user who uses Keyboard only user or may be a user with visual impairment. Another example of a dynamic person is a user with shaky hand, wherein the user may be a person having Parkinson's disease or may be a user travelling in a vehicle on a bumpy road.

In an embodiment, the automated static interface design module 308 is configured to store a prebuilt multi-modal library of Application Programming Interfaces (APIs) providing modular level design corresponding to the one or more pre-defined modes and further configured to generate a design pool of multi-modal designs corresponding to each of the defined static persona based on at least one of the one or more standards and the one or more existing design solutions identified as the best fit design solution, one or more cognitive inputs from a designer pertaining to the best fit design solution and a captured stage of rendering the inclusive system design. The automated static interface design module 308 may consist of APIs providing modular level design for various modes such as visual, audio, haptic, and the like.

In an embodiment, the rendering module 310 is configured to capture a stage of rendering the inclusive system design pertaining to the received requirement involving at least one of a service and interaction design and render the inclusive system design corresponding to one of the defined static persona as a design-time interface to the user and based on the captured stage of rendering. In an embodiment, the rendering module 310 is further configured to render the inclusive system design on the fly corresponding to the identified dynamic persona as the run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user.

Figure 4A:
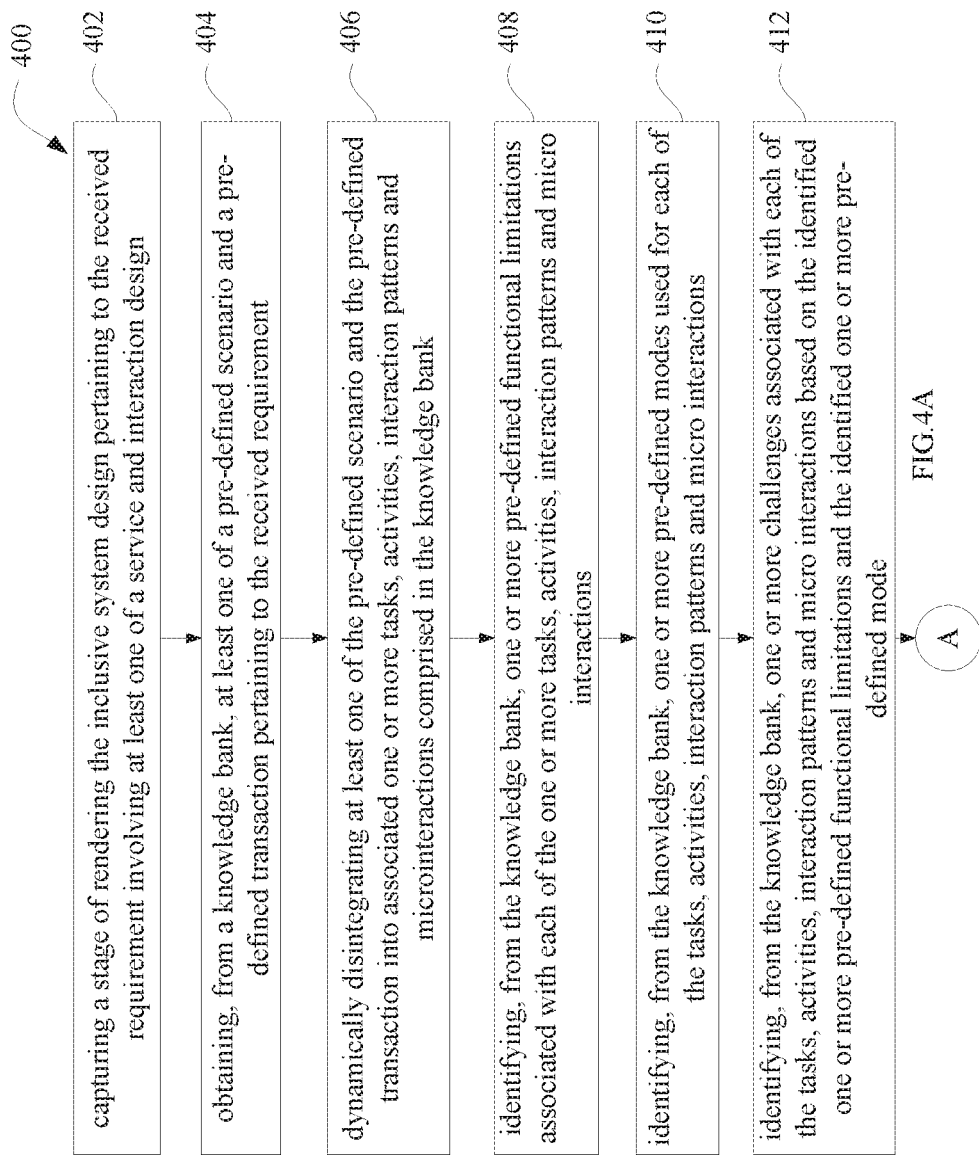
FIG. 4A through FIG. 4C illustrates an exemplary flow diagram of a computer implemented method for intelligent generation of inclusive system designs, in accordance with an embodiment of the present disclosure.
Figure 4B:
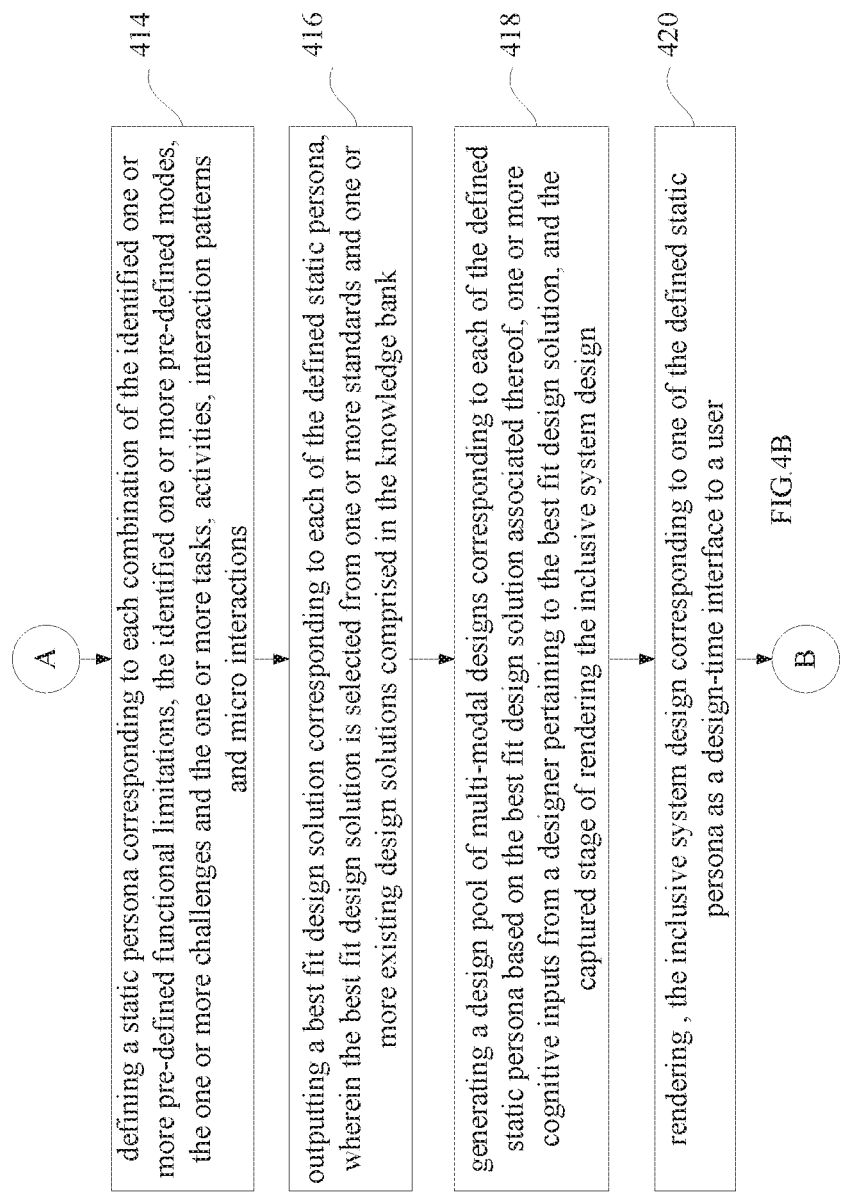
Figure 4C:
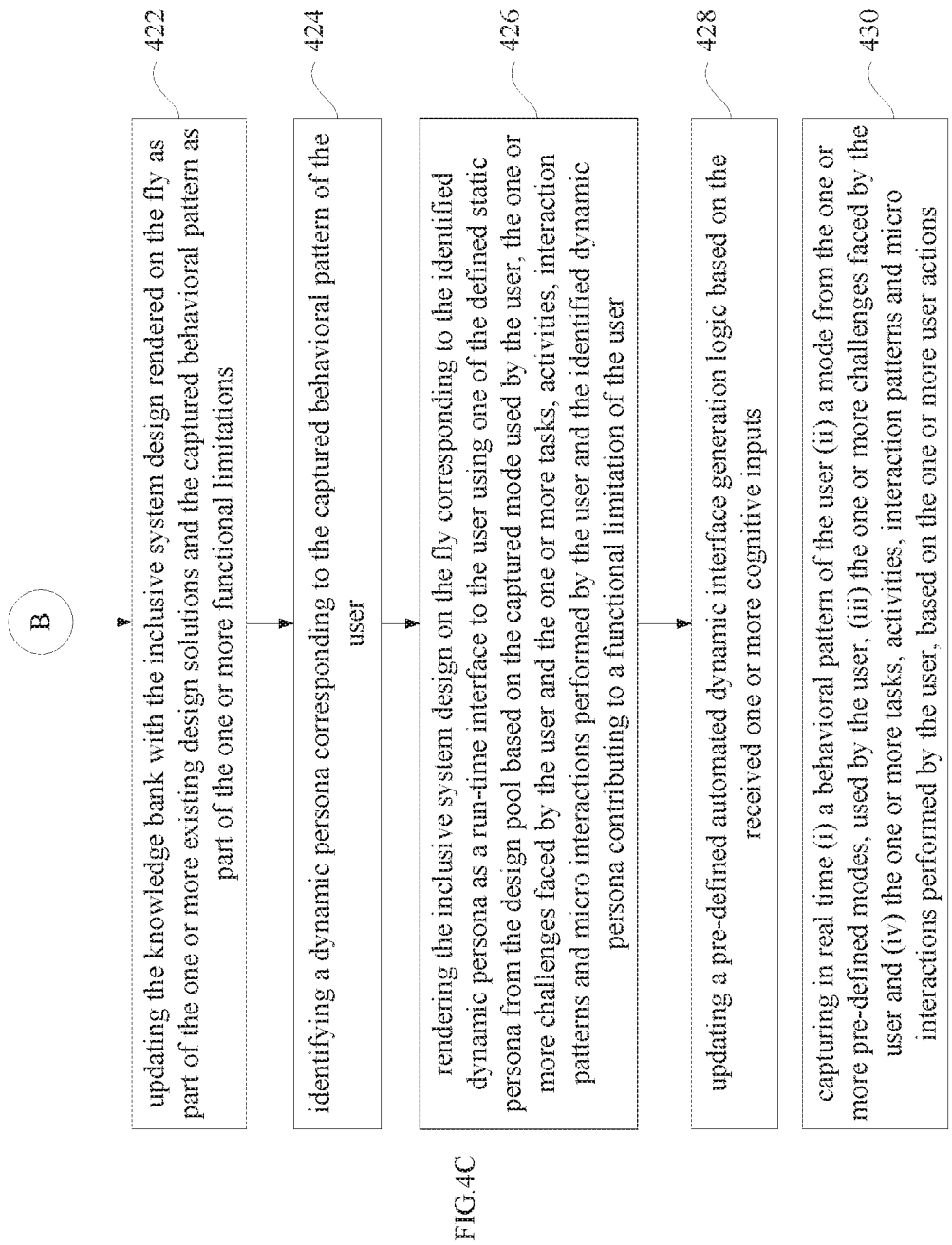

FIG. 4A through FIG. 4C illustrates an exemplary flow diagram of a computer implemented method 400 for intelligent generation of inclusive system designs, in accordance with an embodiment of the present disclosure. The steps of the method 400 will now be explained in detail with reference to the components of the system 100 of FIG. 1 and the functional modules 300 illustrated in FIG. 3.

In an embodiment of the present disclosure, the one or more processors 104 are configured to capture, at step 402, a stage of rendering an inclusive system design pertaining to a received requirement involving at least one of a service and interaction design. In accordance with the present disclosure, identifying the stage of rendering is critical to intelligently determine and present, design considerations to be selected pro-actively at the identified stage of system design. For instance, if the system design is at a stage wherein a drop down box of 100+ countries is required to be displayed for the user to select a country of choice, using speech may have its own limitations. Although speech may be a recommended modality for a given stage depending on say the persona, depending on the scenario, the limitations may pose a challenge. For instance, requiring the user to make a choice from 100+ countries may be challenging for persons of all abilities. A designer may want to explore both textual and visual channel during design at this stage.

In an embodiment of the present disclosure, the one or more processors 104 are configured to obtain, at step 404, at least one of a pre-defined scenario and a pre-defined transaction pertaining to the received requirement from the knowledge bank 302. For instance if the received requirement pertains to creating an e-commerce portal, a pre-defined scenario may pertain to an online shopping website and a pre-defined transaction may pertain to a third-party payment portal.

In an embodiment of the present disclosure, the one or more processors 104 are configured to dynamically disintegrate, at step 406, at least one of the pre-defined scenario and the pre-defined transaction into associated one or more tasks, activities, interaction patterns and microinteractions comprised in the knowledge bank 302.

In an embodiment of the present disclosure, the one or more processors 104 are configured to identify, at step 408, one or more pre-defined functional limitations associated with each of the one or more tasks, activities, interaction patterns and micro interactions from the knowledge bank 302.

In an embodiment of the present disclosure, the one or more processors 104 are configured to identify, at step 410, one or more pre-defined modes from the knowledge bank 302, used for each of the tasks, activities, interaction patterns and micro interactions.

In an embodiment of the present disclosure, the one or more processors 104 are configured to identify, at step 412, one or more challenges associated with each of the tasks, activities, interaction patterns and micro interactions based on the identified one or more functional limitations at step 408 and the identified one or more pre-defined modes at step 410.

In an embodiment of the present disclosure, the one or more processors 104 are configured to define, at step 414, a static persona corresponding to each combination of the identified one or more functional limitations, the identified one or more pre-defined modes, the one or more challenges and the one or more tasks, activities, interaction patterns and micro interactions.

In an embodiment of the present disclosure, the one or more processors 104 are configured to output, at step 416, a best fit design solution corresponding to each of the defined static persona, wherein the best fit design solution is selected from one or more standards and one or more existing design solutions comprised in the knowledge bank 302.

In an embodiment of the present disclosure, the one or more processors 104 are configured to generate, at step 418, a design pool of multi-modal designs corresponding to each of the defined static persona based on the best fit design solution associated thereof, one or more cognitive inputs from a designer pertaining to the best fit design solution, and the captured stage of rendering the inclusive system design.

In an embodiment of the present disclosure, the one or more processors 104 are configured to render, at step 420, the inclusive system design corresponding to one of the defined static persona as a design-time interface to a user.

In an embodiment of the present disclosure, the one or more processors 104 are configured to capture in real time, at step 422, (i) a behavioral pattern of the user (ii) a mode from the one or more pre-defined modes, used by the user, (iii) the one or more challenges faced by the user and (iv) the one or more tasks, activities, interaction patterns and micro interactions performed by the user, based on the one or more user actions.

In an embodiment of the present disclosure, the one or more processors 104 are configured to identify, at step 424, a dynamic persona corresponding to the captured behavioral pattern of the user.

In an embodiment of the present disclosure, the one or more processors 104 are configured to render, at step 426, the inclusive system design on the fly corresponding to the identified dynamic persona as the run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user.

In an embodiment of the present disclosure, the one or more processors 104 are configured to update, at step 428, the pre-defined automated dynamic interface generation logic 304B based on the received one or more cognitive inputs.

In an embodiment of the present disclosure, the one or more processors 104 are configured to update, at step 430, the knowledge bank 302 with the inclusive system design rendered on the fly as part of the one or more existing design solutions and the captured behavioral pattern as part of the one or more functional limitations.

Use case 1: Static scenario: Designer is provided with scenario of designing an online shopping website which is input into the system 100. The scenario is dynamically disintegrated into tasks, activities, interaction patterns and microinteractions comprised in the services module 302A of the knowledge bank 302. In this use case, the scenario of online shopping may be disintegrated into authentication, product viewing, comparison, search, shortlisting, financial transactions, text entry, and the like. For each of these disintegrated components, the one or more functional limitations and the one or more modes are identified from the medical module 302B and the modalities module 302C respectively. Then the challenges are identified from the challenges module 302D based on the identified one or more functional limitations and the identified one or more modes. The combinations of various selections from the services module 302A, the medical module 302B, the modalities module 302C and the challenges module 302D constitute the static personae. Table 1 below shows some exemplary static personae for the use case of online shopping.

TABLE 1

| | | Static Personae | | |
|---|---|---|---|---|
| | Services | Functional limitations | Modes | Challenges |
| Static Persona 1 | Authentication | None | Mobile | Low network |
| Static Persona 2 | Authentication | Cannot view content clearly | Mobile | Low network, small size of content, blurred content |
| Static Persona 3 | Search | Cannot see | Web | Low network, Linear perception and hence time consuming |
| Static Persona 4 | Search | Shaky environment | Mobile | Cannot view content clearly, cannot provide input easily and quickly |

A best fit design solution corresponding to each of the defined static persona is then filtered from the solutions module 302E. The designer may consume the output best fit design solution, create a totally new design or use the automated static interface design module 308 or a combination of both. For each static persona, the designer may choose a best combination of multi-modal design solutions to form a final interface design. It may happen that same design emerges for more than one static persona. Alternatively, the rendering module 310 may render the inclusive system design automatically depending on the captured stage of design. The cognitive inputs of the designer are consumed by the automated dynamic interface generation logic 304B for facilitating automated decision making in real time scenarios.

Use case 2: Real time (Dynamic) scenario: A user with Parkinson's disease is ordering medicines using a mobile app. The user may be using a design-time interface as created in the static scenario above. When searching for a medicine using the design-time interface, the user's hand shakes continuously. This is captured by the behavioral pattern module 304A thereby identifying a dynamic persona as follows: Service: Search, Functional limitation: Shaking hand, Mode: mobile app, Challenge: cannot provide input easily and quickly, the screen controls are too small and proximate each other thereby unintended elements get clicked.

The identified dynamic persona is input to the automated dynamic interface generation logic 304B for making an automated decision on the run-time interface and selecting an appropriate design from the design pool created during the design-time interface generation in the static scenario.

In accordance with an embodiment, the designer is proactively provided with best fit design solution based on the stage of system design to enable the designer to make an informed decision on the design considerations to be adopted for ensuring an inclusive system design that can practically cater to people of all abilities. In accordance with an embodiment of the present disclosure, for an inclusive system design that can practically cater to people of all abilities, besides considerations for PwDs, the system evaluates design considerations and their impact on mainstream users, resolves conflicts, if any, and then presents all available possible options for delivering services and designing interphases in real-time. It is imperative that catering to PwDs does not hamper user experience for mainstream users to make the system design practically inclusive. For instance, if the designer was working on a banking scenario and the stage of system design involved designing content for reminding a customer to renew a fixed deposit. Existing design consideration may prompt use of an electronic mail (e-mail) or short message service (SMS). To complete the transaction, the customer has to go back to the web/mobile channel upon receiving the intimation. However, in light of the information pertaining to challenges, needs, effectiveness of modalities of users of all abilities available in the knowledge bank 302 of the system 100 of the present disclosure, the designer may be presented with new design considerations involving use of speech, for instance, provide an outbound call to the customer (while adhering to security requirements).

In accordance with the present disclosure, in the presence of multiple channels, the system 100 facilitates the designer to use multi-channels to complete a transaction depending on the effectiveness of the modalities. For instance, for issuing a boarding pass, the user may be prompted to provide the Passenger Name Record (PNR) number by speech on the phone; a visual channel may be used to show the interior of the aircraft for viewing available seats; touch modality may be employed for selecting the available seat and Multimedia Messaging Service (MMS) may be employed for issuing the boarding pass to the customer by phone, thus providing a multi-channel solution.

The systems and methods of the present disclosure overcome the limitations in current system design generation by digitizing the user centric inclusive design model which captures the challenges faced by PwDs in a knowledge bank. Depending upon the interaction patterns it provides the designers with suggestions, methods or requirements and ways of designing interaction patterns keeping the needs of PwDs and empathy map in mind for each interaction pattern. Designing with increased empathy for a particular type of disability may hamper usability or accessibility for another type of disability or mainstream users. Accordingly, a trade-off has to be considered for a practically inclusive system design. The system also facilitates the designers to generate a new design pattern for covering the broad range of users (PwDs and mainstream) to be inclusive in a real sense. Thus, systems and methods of the present disclosure provide building of a knowledge bank, re-usable interaction patterns and components, new guidelines or a totally new technology solution without curtailing the creativity of designers.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device may be any kind of device which may be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method (400) for intelligent generation of an inclusive system design on the fly in response to a received requirement or one or more user actions, the method comprising the steps of:

capturing, by one or more processors, a stage of rendering the inclusive system design pertaining to the received requirement involving at least one of a service and interaction design (402);

obtaining, by the one or more processors, from a knowledge bank, at least one of a pre-defined scenario and a pre-defined transaction pertaining to the received requirement (404);

dynamically disintegrating, by the one or more processors, at least one of the pre-defined scenario and the pre-defined transaction into associated one or more tasks, activities, interaction patterns and microinteractions comprised in the knowledge bank (406);

identifying, by the one or more processors, from the knowledge bank, one or more pre-defined functional limitations associated with each of the one or more tasks, activities, interaction patterns and micro interactions (408);

identifying, by the one or more processors, from the knowledge bank, one or more pre-defined modes used for each of the tasks, activities, interaction patterns and micro interactions (410);

identifying, by the one or more processors, from the knowledge bank, one or more challenges associated with each of the tasks, activities, interaction patterns and micro interactions based on the identified one or more pre-defined functional limitations and the identified one or more pre-defined modes (412);

defining, by the one or more processors, a static persona corresponding to each combination of the identified one or more pre-defined functional limitations, the identified one or more pre-defined modes, the one or more challenges and the one or more tasks, activities, interaction patterns and micro interactions (414);

outputting, by the one or more processors, a best fit design solution corresponding to each of the defined static persona, wherein the best fit design solution is selected from one or more standards and one or more existing design solutions comprised in the knowledge bank (416);

generating, by the one or more processors, a design pool of multi-modal designs corresponding to each of the defined static persona based on the best fit design solution associated thereof, one or more cognitive inputs from a designer pertaining to the best fit design solution, and the captured stage of rendering the inclusive system design (418);

rendering, by the one or more processors, the inclusive system design corresponding to one of the defined static persona as a design-time interface to a user (420);

capturing in real time, by the one or more processors, (i) a behavioral pattern of the user (ii) a mode from the one or more pre-defined modes, used by the user, (iii) the one or more challenges faced by the user and (iv) the one or more tasks, activities, interaction patterns and micro interactions performed by the user, based on the one or more user actions (422);

identifying, by the one or more processors, a dynamic persona corresponding to the captured behavioral pattern of the user (424); and rendering, by the one or more processors, the inclusive system design on the fly corresponding to the identified dynamic persona as a run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user (426).

2. The processor implemented method of claim 1 further comprising:

updating, by the one or more processors, a pre-defined automated dynamic interface generation logic based on the received one or more cognitive inputs (428); and updating, by the one or more processors, the knowledge bank with the inclusive system design rendered on the fly as part of the one or more existing design solutions and the captured behavioral pattern as part of the one or more functional limitations (430).

3. A system (100) for intelligent generation of an inclusive system design on the fly in response to a received requirement or one or more user actions, the system comprising:

one or more internal data storage devices (102) operatively coupled to one or more hardware processors (104) for storing instructions configured for execution by the one or more hardware processors, the instructions being comprised in:

a knowledge bank (302) comprising:
  a services module (302A) configured to store a plurality of scenarios and transactions pertaining to a plurality of requirements involving at least one of a service and interaction design; and a plurality of task, activities, interaction patterns and microinteractions corresponding to one or more of the plurality of scenarios and transactions;
  a medical module (302B) configured to store one or more pre-defined functional limitations associated with each of the tasks, activities, interaction patterns and micro interactions;
  a modalities module (302C) configured to store one or more pre-defined modes used for each of the tasks, activities, interaction patterns and micro interactions;
  a challenges module (302D) configured to store one or more challenges associated with each of the tasks, activities, interaction patterns and micro interactions based on the identified one or more functional limitations and the identified one or more pre-defined modes; and
  a solutions module (302E) configured to store one or more standards and one or more existing design solutions;

an Artificial Intelligence-Machine Learning (AI-ML) module (304) configured to capture real time need and preferences of a user and enable learning thereof over a period of time, the AI-ML module comprising:
  a behavioral pattern module (304A) configured to capture (i) a behavioral pattern of the user (ii) a mode from the one or more pre-defined modes, used by the user, (iii) the one or more challenges faced by the user and (iv) the one or more tasks, activities, interaction patterns and micro interactions performed by the user, based on the one or more user actions;
  an automated dynamic interface generation logic (304B) configured to receive one or more cognitive inputs from a designer pertaining to a best fit design solution and evolve through machine learning and further configured to receive a dynamic persona corresponding to the captured behavioral pattern of the user for making an automated decision on a run-time interface;

a persona creator module (306) configured to define a static persona corresponding to each combination of the identified one or more functional limitations, the identified one or more pre-defined modes, the one or more challenges and the one or more tasks, activities, interaction patterns and micro interactions and further configured to identify the dynamic persona;

an automated static interface design module (308) configured to store a prebuilt multi-modal library of Application Programming Interfaces (APIs) providing modular level design corresponding to the one or more pre-defined modes and further configured to generate a design pool of multi-modal designs corresponding to each of the defined static persona based on at least one of the one or more standards and the one or more existing design solutions identified as the best fit design solution, one or more cognitive inputs from a designer pertaining to the best fit design solution and a captured stage of rendering the inclusive system design; and a rendering module (310) configured to:
capture a stage of rendering the inclusive system design pertaining to the received requirement involving at least one of a service and interaction design and render the inclusive system design corresponding to one of the defined static persona as a design-time interface to the user and based on the captured stage of rendering; and render the inclusive system design on the fly corresponding to the identified dynamic persona as the run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user.

4. A computer program product comprising a non-transitory computer readable medium having a computer readable program embodied therein, wherein the computer readable program, when executed on a computing device, causes the computing device to:

capture a stage of rendering the inclusive system design pertaining to the received requirement involving at least one of a service and interaction design;

obtain from a knowledge bank comprised therein, at least one of a pre-defined scenario and a pre-defined transaction pertaining to the received requirement;

dynamically disintegrate at least one of the pre-defined scenario and the pre-defined transaction into associated one or more tasks, activities, interaction patterns and microinteractions comprised in the knowledge bank;

identify from the knowledge bank, one or more pre-defined functional limitations associated with each of the one or more tasks, activities, interaction patterns and micro interactions;

identify from the knowledge bank, one or more pre-defined modes used for each of the tasks, activities, interaction patterns and micro interactions;

identify from the knowledge bank, one or more challenges associated with each of the tasks, activities, interaction patterns and micro interactions based on the identified one or more functional limitations and the identified one or more pre-defined modes;

define a static persona corresponding to each combination of the identified one or more functional limitations, the identified one or more pre-defined modes, the one or more challenges and the one or more tasks, activities, interaction patterns and micro interactions;

output a best fit design solution corresponding to each of the defined static persona, wherein the best fit design solution is selected from one or more standards and one or more existing design solutions comprised in the knowledge bank;

generate a design pool of multi-modal designs corresponding to each of the defined static persona based on the best fit design solution associated thereof, one or more cognitive inputs from a designer pertaining to the best fit design solution, and the captured stage of rendering the inclusive system design;

render the inclusive system design corresponding to one of the defined static persona as a design-time interface to a user;

capture in real time (i) a behavioral pattern of the user (ii) a mode from the one or more pre-defined modes, used by the user, (iii) the one or more challenges faced by the user and (iv) the one or more tasks, activities, interaction patterns and micro interactions performed by the user, based on the one or more user actions;

identify a dynamic persona corresponding to the captured behavioral pattern of the user; and render the inclusive system design on the fly corresponding to the identified dynamic persona as a run-time interface to the user using one of the defined static persona from the design pool based on the captured mode used by the user, the one or more challenges faced by the user and the one or more tasks, activities, interaction patterns and micro interactions performed by the user and the identified dynamic persona contributing to a functional limitation of the user.

5. The computer program product of claim 4, wherein the computer readable program further causes the computing device to perform one or more of:

updating a pre-defined automated dynamic interface generation logic based on the received one or more cognitive inputs; and updating the knowledge bank with the inclusive system design rendered on the fly as part of the one or more existing design solutions and the captured behavioral pattern as part of the one or more functional limitations.

* * * * *